United States Patent [19]
Fry

[11] 3,869,147
[45] Mar. 4, 1975

[54] ARTICULATED VEHICLE COUPLING
[75] Inventor: Timothy Selwyn Fry, Dunchurch, England
[73] Assignee: Bartel Engineering Limited, London, England
[22] Filed: July 16, 1973
[21] Appl. No.: 379,704

[30] Foreign Application Priority Data
July 21, 1972 Great Britain.................... 34162/72

[52] U.S. Cl............................................ 280/438 R
[51] Int. Cl............................................ B62d 53/06
[58] Field of Search..................... 280/438 R, 438 A

[56] References Cited
UNITED STATES PATENTS
2,809,851  10/1957  Beck ............................. 280/438 R
3,073,624  1/1963   Thomas.......................... 280/438 R
3,528,683  9/1970   Janeway......................... 280/438 R Primary Examiner—Stanley H. Tollberg
Attorney, Agent, or Firm—Edward F. Connors

[57] ABSTRACT

An articulated vehicle coupling to be arranged between a tractor including a chassis, supporting front and rear axles, and a semi-trailer. The coupling is to be mounted on a portion of the chassis adjacent the rear of the tractor and includes a pivot defining an axis of vertical articulation. When the coupling is arranged between the tractor and semi-trailer the axis of vertical articulation will be in or below a plane containing the uppermost surface of said portion of the chassis member.

10 Claims, 9 Drawing Figures

PATENTED MAR 4 1975    3,869,147

SHEET 1 OF 4

ARTICULATED VEHICLE COUPLING

The invention relates to an articulated vehicle coupling to be arranged between a tractor, having at least a front and a rear axle and a chassis member carrying the axles, and a semi-trailer. The term semi-trailer means a trailer of the kind usually employed in an articulated vehicle in which the axis of vertical articulation is positioned forward of the points of contact with the ground wheels adjacent the rear of the tractor.

In known articulated vehicles, the coupling is usually mounted on a portion of the chassis member adjacent the rear of the tractor and includes a pivot defining an axis of vertical articulation for the tractor and semi-trailer above a plane containing the uppermost surface of said portion of the chassis member. However during braking of an articulated vehicle of this kind a forward weight transfer from the semi-trailer to the tractor occurs and loads the front and rear axles in varying proportion. During heavy braking the proportion of the weight transferred to the front axle increases and leads to a reduction in loading on the rear axle. Consequently the road wheels carried by the rear axle or axles of the tractor are likely to be locked under braking and this may lead to jack-knifing of the vehicle. Various methods have been proposed to prevent the rear wheels from locking in this way including means for automatically adjusting the rate of application of the brakes. However none of these methods is entirely satisfactory. Furthermore in order to brake the front wheels of the tractor satisfactorily very large brakes are required because of the considerable proportion of the load transferred to the front axle or axles on braking. Also the or each front axle has to be so constructed that it will be capable of withstanding such loading.

Furthermore with known articulated vehicles, there is a tendency for the tractor to pitch when the vehicle accelerates as the driving wheels of the tractor tend to move the tractor about the axis of vertical articulation. The tractor also tends to pitch during travel over an uneven surface as the distance between the points of contact with the ground of the driving wheels of the tractor and the wheels of the semi-trailer varies during vertical articulation.

An object of the invention is to mitigate these disadvantages.

According to the invention there is provided an articulated vehicle coupling to be arranged between a tractor and a semi-trailer, the tractor including a chassis member carrying at least one front and one rear axle and including a portion adjacent the rear of the tractor on which the coupling is to be mounted, the coupling including pivot means defining an axis of vertical articulation between the tractor and semi-trailer, the axis of vertical articulation, when the coupling is arranged between the tractor and semi-trailer, being positioned between the front and rear axles and in or below a plane containing the uppermost surface of said portion of the chassis member.

The axis of vertical articulation may be below a plane containing the lowermost surface of said portion of the chassis member, below the axis of rotation of road wheels carried by the or each rear axle or substantially level with or below a plane containing the bottom of road wheels carried by the front and rear axles.

The pivot means may comprise a guide arranged to be mounted on the tractor or the semi-trailer and when so mounted defining a substantially arcuate path having a centre of curvature defining the axis of vertical articulation between the tractor and the semi-trailer, a member movable relatively to the guide along the substantially arcuate path and means for restraining the guide and the member from separation one from the other, whereby on mounting the guide on one of the tractor and the semi-trailer and engaging the member with the other of the tractor and the semi-trailer, relative vertical articulation between the tractor and the semi-trailer about said axis of vertical articulation is permitted.

Where the guide is to be carried by the tractor, the member may be a fifth wheel coupling plate which locates the semi-trailer.

Alternatively, where the member is to be carried by the semi-trailer, the member may carry pivot means engageable with a fifth wheel coupling plate carried by the tractor.

The pivot means may alternatively include at least two Watt-type linkages arranged one behind the other, each linkage comprising two arms, each arranged to be pivotally connected at one of its ends to the tractor or semi-trailer and at the other of its ends to a link member arranged to be mounted on the other of the tractor and semi-trailer whereby relative vertical articulation will be permitted between the tractor and the semi-trailer about an axis of vertical articulation defined by the instantaneous centre of curvature of arcs through which the arms of the linkages will move.

The invention also includes an articulated vehicle comprising a tractor and a semi-trailer interconnected by an articulated vehicle coupling as set out in any of the six immediately preceding paragraphs.

An articulated vehicle coupling in accordance with the invention will now be described, by way of example, with reference to the accompanying drawings in which.

In the figures corresponding parts carry like reference numerals.

Figure 1:
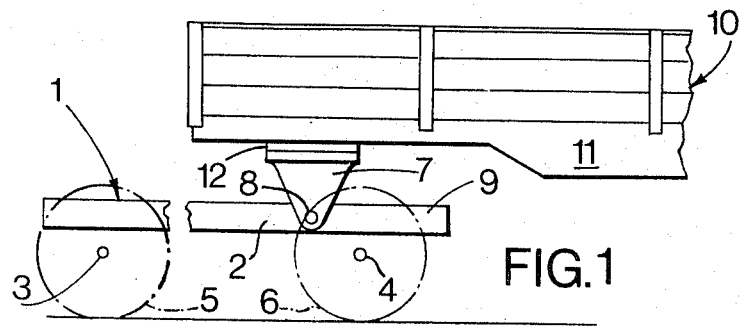
FIG. 1 is a side elevation of portions of a tractor and semi-trailer of an articulated vehicle showing one form of coupling therebetween.

Referring firstly to FIG. 1, a tractor 1 has a chassis 2 which carries respective front and rear axles 3, 4 for road wheels 5, 6. A coupling member 7 is connected at its lower end to a pivot 8 which is positioned below the uppermost surface 9 of a portion of the chassis 2 adjacent the rear of the tractor 1 and forwardly of the rear axle 4. The upper end of the coupling member 7 is pivotally connected to a chassis 11 of semi-trailer 10 by a swivel or turntable 12. The pivot 8 permits vertical articulation of the tractor 1 and semi-trailer 10 relatively to each other, whilst the swivel 12 permits lateral relative movement of the tractor 1 and semi-trailer 10.

Figure 2:
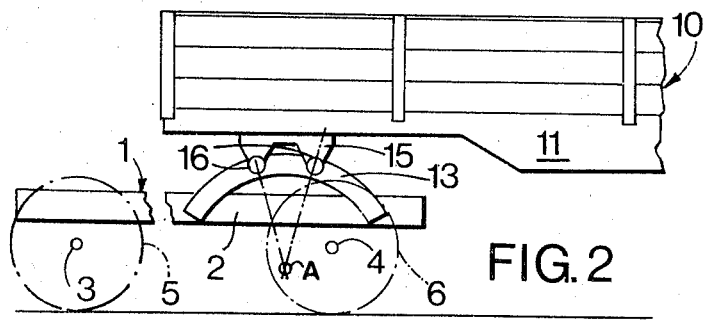
FIG. 2 is a view similar to FIG. 1 showing an alternative form of coupling.

In FIG. 2, the chassis 2 carries a track 13 which is arcuate about an imaginary point A below the chassis 2 and forwardly of the rear axle 4. The chassis 11 of the semi-trailer 10 is pivotally connected to a roller support 15 by a swivel (not shown), the swivel allowing lateral relative movement of the tractor 1 and semi-trailer 10. The roller support 15 carries two rollers 16 movable along the track 13 to enable the tractor 1 and semi-trailer 10 to articulate vertically about the point A.

Figure 3:
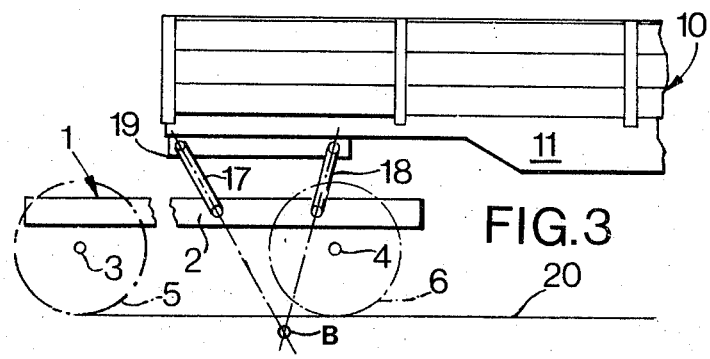
FIG. 3 is a view similar to FIGS. 1 and 2 showing a further form of coupling.

In FIG. 3 the chassis 2 is pivotally connected to the lower ends of two links 17, 18. The upper ends of the links 17, 18 are pivotally connected to a link support 19 which is connected by a swivel (not shown) to the chassis 11 of the semi-trailer 10. The links 17, 18 converge towards an imaginary point B below the level of the bottom of the wheels 5, 6, i.e., below ground level 20. The swivel enables the tractor 1 and semi-trailer 10 to move laterally relatively to each other whilst the links 17, 18 enable the tractor and semi-trailer to articulate vertically about the point B. As upward or downward articulation occurs, corresponding movement of the imaginary point B in the fore-and-aft direction will also occur.

Figure 4:
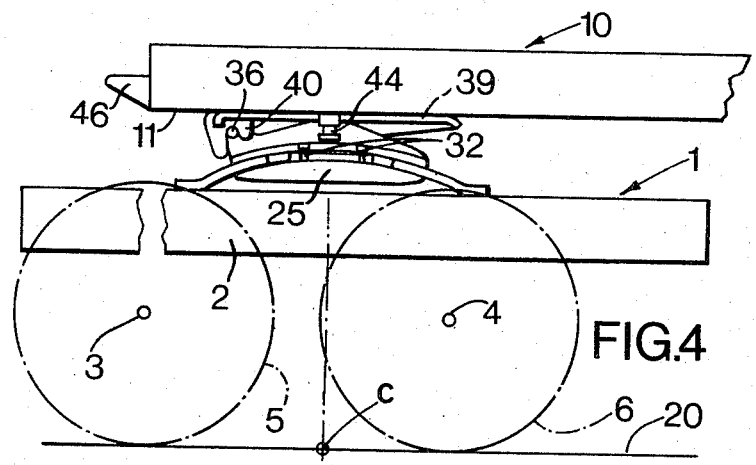
FIG. 4 is a side elevation of a coupling carried by the tractor of an articulated vehicle and engageable with the semi-trailer.
Figure 5:
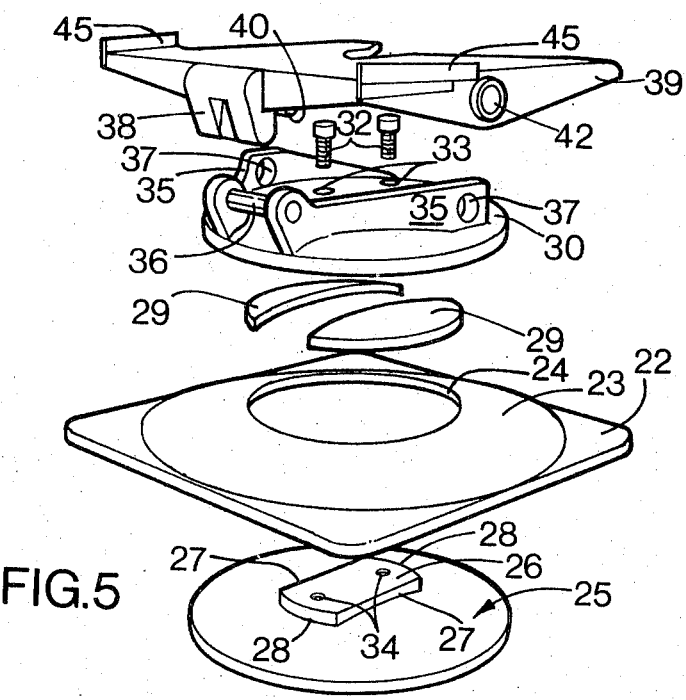
FIG. 5 is an exploded perspective view of the coupling shown in FIG. 4.

With reference now to FIGS. 4 and 5, a rectangular or square plate 22, having a domed centre portion 23, is attached to the chassis 2. The domed portion 23 is part-spherical and has a centre of curvature corresponding to the point C shown in FIG. 4. The point C may be higher or lower than the ground-level position 20 if desired. A circular aperture 24 is formed centrally in the domed portion 23. The underside of the domed portion 23, as viewed in the drawings, is engaged by a convex upper surface of a plate 25. The convex upper surface of the plate 25 is complementary to the underside of the domed portion 23. A central projection 26 is provided on the convex upper surface of the plate 25 and has parallel sides 27 and curved ends 28. As can be seen in FIG. 1, the length of the projection 26 is less than the diameter of the aperture 24. Two segmental plates 29 are located on each side of the projection 26 and restrain the plate 25 against arcuate movement along the underside of the domed portion 23 other than in a direction parallel with the sides 27. The upper surface of the domed portion 23 is engaged by a concave lower surface of a further plate 30. The concave lower surface of the further plate 30 is complementary to the upper surface of the domed portion 23. Bolts 32 extend through apertures 33 in the further plate 30 and engage screw-threaded holes 34 in the projection 26. The upper side of the further plate 30 carries two flanges 35. A rod 36 extends between the flanges 35 adjacent one end thereof and coaxial apertures 37 are formed in the flanges 35 remote from the rod 36. The rod 36 is engageable with a hook 38 carried by the front end of a fifth wheel coupling plate 39, the hook 38 being pivotally connected to a latch plate 40. The rod 36, hook 38 and latch plate 40 together constitute a latch, the rod 36 and hook 38 being optionally engageable or disengageable. The fifth wheel coupling plate 39 carries stub axles 42 (one only of which is shown) which locate in the apertures 37. With the hook 38 disengaged from the rod 36, the fifth wheel coupling plate 39 is free to pivot about its stub axles 42 to enable it to align with the chassis 11 and a pin 44 mounted on the semi-trailer 10. When the pin 44 has become located in the fifth wheel coupling plate 39, as shown in FIG. 4, the hook 38 and rod 36 interengage and the latch plate 40 may then be moved into an operative position to prevent the hook and rod from becoming disengaged. Two parallel plates 45 are attached to the fifth wheel coupling plate 39 and engage the chassis 11 of the semi-trailer 10. The plates 45 ensure that the sides 27 of the projection 26 are parallel with the fore-and-aft direction of the semi-trailer 10 when the pin 44 is located in the fifth wheel coupling plate 39. Thus the coupling will permit only pitching movement of the semi-trailer 10 and restrains the semi-trailer against rolling movement. However, where it is desired to permit rolling movement of the semi-trailer 10, the segmental plates 29 may be omitted. To enable the semi-trailer 10 to locate easily on the fifth wheel coupling plate 39, a ramp 46 may be provided at the front end of the chassis 11 of the semi-trailer 10. If desired the coupling may be adapted such that the plate 22 is mounted on the semi-trailer 10 and the pin 44 extends through the plates 25 and 30 to locate in a fifth wheel coupling plate carried by the chassis 2 of the tractor 1. In such a case the fifth wheel coupling plate 39 would be omitted. The further plate 30 and the fifth wheel coupling plate 39 could be made as a single unit if desired. In this case the apertures 37, stub axles 42 and latch would not be required.

Figure 6:
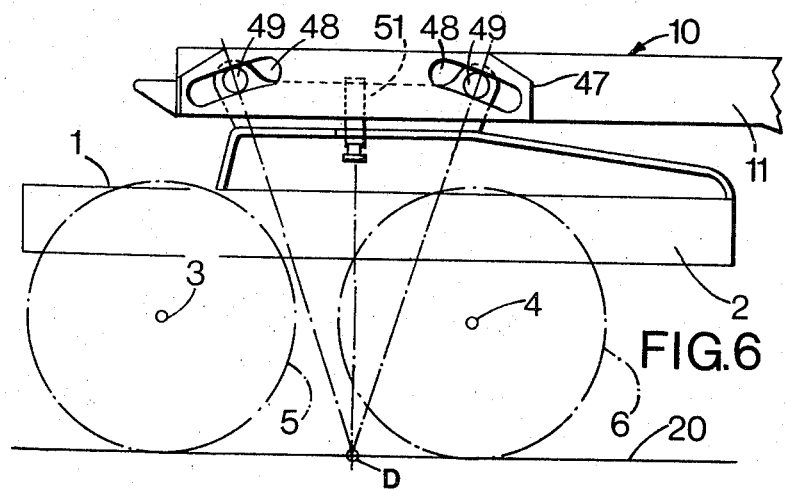
FIG. 6 is a side elevation of a coupling carried by the semi-trailer of an articulated vehicle and engageable with the tractor.
Figure 7:
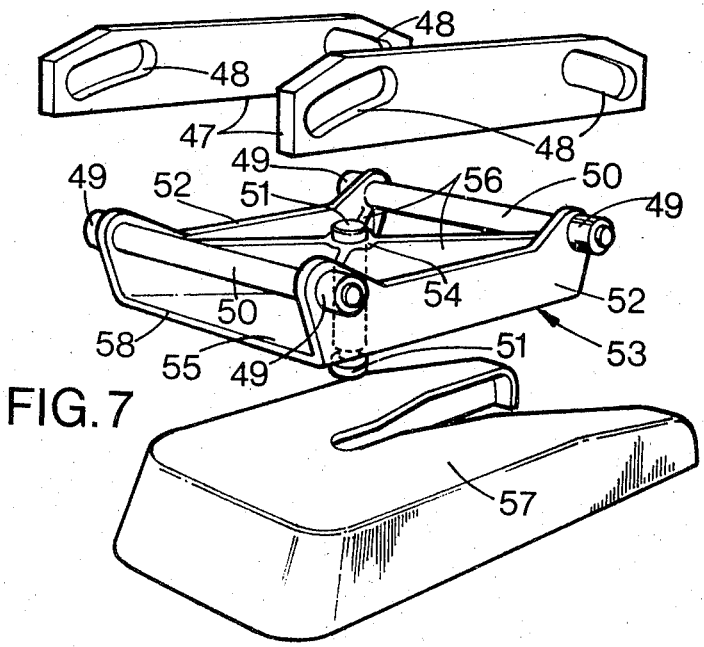
FIG. 7 is an exploded perspective view of the coupling shown in FIG. 6.

With reference next to FIGS. 6 and 7, the chassis 11 of the semi-trailer 10 carries two parallel plates 47. Each plate is formed with an inclined elongate aperture 48 adjacent each end. The apertures 48 may be arcuate and have a centre of curvature corresponding to the point D. Alternatively the apertures 48 may be straight sided and so inclined that imaginary straight lines extending in a vertical plane at right angles to the apertures 48 and from midway between the ends of the apertures will intersect at the point D. If desired, the point D may be higher or lower than the ground level 20. The apertures 48 locate rollers 49 mounted one at each end of two parallel rods 50 carried by parallel sides 52 of a king-pin mounting member 53. The king-pin 51 is located in an aperture defined in a central boss 54 in the mounting member 53, the boss 54 being supported by a base-plate 55 of the mounting member 53 and by diagonal webs 56. The king-pin 51 locates in a fifth wheel coupling plate 57 carried by the chassis 2 of the tractor 1. To enable the mounting member 53 to locate easily on the fifth wheel coupling plate 57, the base-plate 55 of the mounting member 53 may be provided with a ramp (not shown) along its front edge 58. The positions of the plates 47 and the mounting member 53 could be reversed if necessary. In such a case the king-pin 51 would be carried on a member extending between the plates 47 and the mounting member 53 would be inverted and carried by the semi-trailer 10. If desired, the mounting member 53 could alternatively be connected to the chassis 2 of the tractor 1 for pivoting about a vertical axis. In such a case the plates 47 could carry a fifth wheel coupling plate engageable with a pin mounted on the semi-trailer 10. Such an arrangement would be similar to that shown in FIGS. 4 and 5 where the fifth wheel coupling plate 39 is engaged by the pin 44 on the semi-trailer 10. Instead, the plates 47 could be mounted on the chassis 2 of the tractor 1 for pivoting about a vertical axis and the mounting member 53 could carry the fifth wheel coupling plate. Instead of using rods 50 to support the rollers 49, stub axles mounted in the sides 52 could be used. Instead of using rollers 49, non-rotatable bearing elements may be used. Although two apertures 48 have been shown in each plate 55, one aperture extending substantially between the ends of each plate may alternatively be provided. If desired, the king-pin 51 may be arranged off-centre with respect to the member 53. The plates 47 are arranged parallel with the fore-and-aft direction of the semi-trailer, whereby ptiching movement only of the semi-trailer 10 is permitted.

Figure 8:
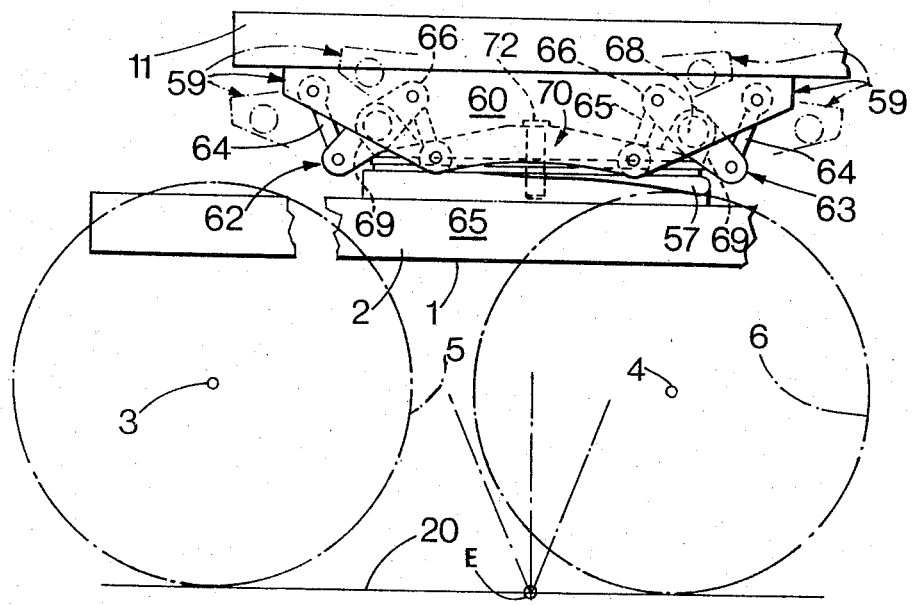
FIG. 8 is a side elevation of a coupling carried by the tractor of an articulated vehicle and including Watt-type linkages.
Figure 9:
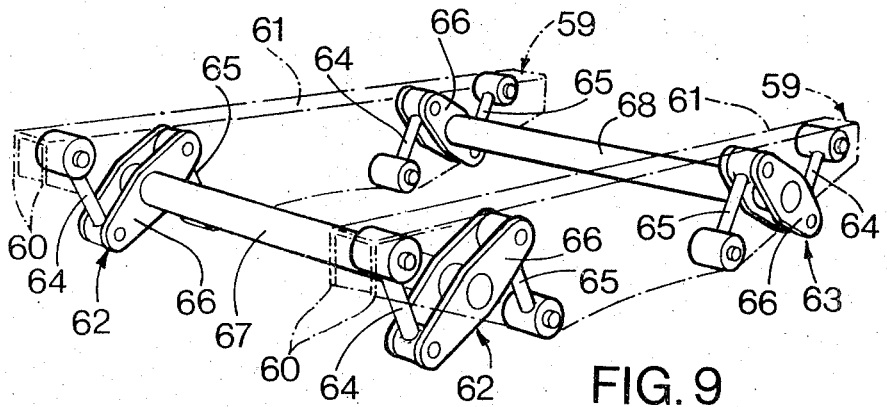
FIG. 9 is a perspective view of the coupling shown in FIG. 8.

With reference to FIGS. 8 and 9, the chassis 11 of the semi-trailer 10 carries two parallel channel cross-section supports 59 each having side-walls 60 and a web 61. Pivotally mounted between the side walls 60 of each support 59 are identical front and rear Watt-type linkages 62, 63. Each of the front and rear linkages comprises two arms 64, 65 and a link member 66. Each arm 64 is pivotally connected to the side walls 60 of its associated support 59 adjacent the web 61 and adjacent one end of the support. Each arm 65 is also pivotally connected to the side walls 60 of its associated support 59 but at a position remote from the web 61 and remote from the pivot for its associated arm 64. The free ends of the arms 64, 65 are pivotally interconnected by their associated link members 66 which are movable relatively to the supports 59. The link members 66 of the front linkages 62 are interconnected by a tube or rod 67 and the link members 68 of the rear linkages are interconnected by a similar tube or rod 68. The rods 67, 68 pass through clearance apertures, slots or the like (not shown) formed in the inboard side walls 60 of the supports 59. As can be seen in FIG. 8, the rods 67, 68 are pivotally connected by means of brackets 69 or other suitable means to a turntable 70 carried by the chassis 2 of the tractor 1 and the supports 59 are connected by means (not shown) to the semi-trailer 10. The turntable 70 may be a conventional kind having a pivot pin 72 locatable in a fifth wheel coupling plate 57. In the embodiment illustrated, the arms 65 are shorter than the arms 64. Therefore movement of the supports 58 relatively to the rods 67, 68 in the fore-and-aft direction of the semi-trailer 10 as shown in broken lines will be arcuate about a point E. Point E is the instantaneous centre of curvature of the arcs through which the arms 64, 65 of the linkages move. If desired the point E may be arranged higher or lower than the ground level position 20 by suitably varying the lengths of the arms 64 or 65. Also the rods 67, 68 need not be arranged symmetrically in the fore-and-aft direction of the semi-trailer with respect to the axis of rotation of the turntable 70. Although four Watt-type linkages 62, 63 and two supports 59 have been described, two linkages 62, 63 could be arranged on a single support 59 and be arranged beneath the longitudinal axis of the semi-trailer 10. If desired, the support or supports 59 could alternatively locate on the turntable 70 and the rods 67, 68 on the semi-trailer 10.

In the embodiments described in FIGS. 4 to 9, each fifth wheel coupling plate incorporates a fifth wheel coupling latch (not shown) of known kind.

If desired, means such as resilient buffers may be provided for limiting pitching movement of the semi-trailer 10.

Known kinds of fifth wheel restraining devices may be incorporated into the embodiments described with reference to FIGS. 4 to 9 if desired.

The positioning of the point about which the tractor 1 and semi-trailer 10 can articulate vertically as shown in FIGS. 1 to 9 leads to the condition where upon braking, the proportional variation of weight transfer from the semi-trailer to the front and rear axles 3, 4 of the tractor 1 is reduced as the axis of vertical articulation is lowered to an optimum position. By positioning the axis of vertical articulation in the optimum position, that is at a position substantially level with a plane containing the bottom of the road wheels 5, 6, it has been found that the proportion of the weight transfer from the semi-trailer 10 to the front and rear axles 3, 4 of the tractor 1 remains constant for all conditions of loading and deceleration. Such a condition may simplify front axle design considerably and the design of the braking system of the tractor 1, auxiliary means hitherto proposed for automatically adjusting the rate of application of the brakes under various braking conditions not being required.

In FIGS. 1 to 3, the positions of the axes of vertical articulation improve the distribution of the load transferred from the semi-trailer 10 to the front and rear axles 3, 4 of the tractor 1. However the proportion of the weight transferred to the front and rear axles 3, 4 is not constant for all conditions of braking and loading. Furthermore the point B in FIG. 3 is not stationary during vertical articulation of the tractor 1 and semi-trailer 10. However in the embodiments shown in FIGS. 4 to 9 with the centre of pivoting at a position substantially level with a plane containing the bottom of the road wheels 5, 6, that is at ground level, it has been found that the proportion of the weight transferred from the semi-trailer 10 to the front and rear axles of the tractor 1 will remain constant for all conditions of loading and deceleration. Furthermore the points C, D and E are substantially stationary during vertical articulation of the tractor 1 and semi trailer 10.

In FIG. 1, the pivot 8 may, if desired, be positioned below the rear axle 4. Likewise the point A in FIG. 2 may be raised or lowered by altering the vertical positioning or radius of the track 13 and the point B in FIG. 3 may be raised or lowered by altering the angle between the links 17, 18.

By using a coupling in accordance with the invention the tendency of the tractor 1 to pitch during acceleration or when travelling over uneven ground is considerably reduced.

Although the invention has been described with reference to articulated vehicles, the couplings could be used for interconnecting tractors and earthworking or other implements. Furthermore the tractor may be of an integral construction where the front and rear axles and coupling are carried by the body of the tractor.

What I claim as my invention and desire to secure by Letters Patent of the United States is:

1. A coupling for connection between a tractor and a semi-trailer in an articulated vehicle of which the tractor includes a chassis and at least one front and one rear axle carried by said chassis, the coupling including a fifth wheel coupling plate to be mounted on one of the tractor and the semi-trailer to rotate relatively thereto about an upright axis, pivot means defining said upright axis, a domed plate having a central aperture therein, a complementary concave element engaging the upper surface of the domed plate, a complementary convex element engaging the lower surface of the domed plate, means extending through the aperture in the domed plate restraining the domed plate and the complementary concave and convex elements from axial separation one from another, means connecting together the complementary concave element and the fifth wheel coupling plate, the domed plate defining an arcuate path along which the complementary concave element and the fifth wheel coupling plate are slidable relatively to the domed plate and providing at the centre of curvature of said arcuate path an axis of vertical articulation between the tractor and the semi-trailer, said axis of vertical articulation positioned between the front and rear axles of the tractor and below the chassis thereof, and means constraining the fifth wheel coupling plate to move with the semi-trailer on relative pivotal movement between the tractor and the semi-trailer about said upright axis, the means connecting together the complementary concave element and the fifth wheel coupling plate including a two part latch, one of the parts of the latch being carried by the fifth wheel coupling plate and the other of said parts of the latch being carried by the concave element.

2. A coupling for connection between a tractor and a semi-trailer in an articulated vehicle of which the tractor includes a chassis and at least one front and one rear axle carried by said chassis, the coupling including a fifth wheel coupling plate to be mounted on one of the tractor and the semi-trailer to rotate relatively thereto about an upright axis, pivot means defining said upright axis, a domed plate having a central aperture therein, a complementary concave element engaging the upper surface of the domed plate, a complementary convex element engaging the lower surface of the domed plate, means extending through the aperture in the domed plate restraining the domed plate and the complementary concave and convex elements from axial separation one from another, means connecting together the complementary concave element and the fifth wheel coupling plate, the domed plate defining an arcuate path along which the complementary concave element and the fifth wheel coupling plate are slidable relatively to the domed plate and providing at the centre of curvature of said arcuate path an axis of vertical articulation between the tractor and the semi-trailer, said axis of vertical articulation positioned between the front and rear axles of the tractor and below the chassis thereof, and means constraining the fifth wheel coupling plate to move with the semi-trailer on relative pivotal movement between the tractor and the semi-trailer about said upright axis, the central aperture being circular and including two diametrically opposed segmental plates having curved edges complementary to said central circular aperture in said domed plate and arranged in said central circular aperture in said domed plate between the concave and convex elements to restrain the fifth wheel coupling plate against arcuate movement other than in the fore-and-aft direction of the semi-trailer, a projection having parallel edges formed on the convex element, and the segmental plates having straight edges parallel to one another and arranged closely adjacent said parallel edges of the projection, the parallel edges of the segmental plates being arranged to lie in the fore-and-aft direction of the semi-trailer, and the fifth wheel coupling plate carrying means for preventing the semi-trailer from turning laterally relatively to the fifth wheel coupling plate.

3. A coupling for connection between a tractor and a semi-trailer in an articulated vehicle of which the tractor includes a chassis and at least one front and one rear axle carried by said chassis, the coupling including a member to be mounted on one of the tractor and semi-trailer to rotate relatively thereto about an upright axis, pivot means defining said upright axis, guide means defining an arcuate path along which said member is relatively movable and providing at the centre of curvature of said arcuate path an axis of vertical articulation between the tractor and semi-trailer, said axis of vertical articulation positioned between the front and rear axles of the tractor and below the chassis thereof, means holding the guide means and the member from separation one from the other, means constraining the member to turn with the semi-trailer on relative pivotal movement between the tractor and the semi-trailer about said upright axis and resilient means to limit the amount of movement between the member and said guide means.

4. A coupling for connection between a tractor and a semi-trailer in an articulated vehicle of which the tractor includes a chassis and at least one front and one rear axle carried by said chassis, the coupling including a member to be mounted on one of the tractor and the semi-trailer to rotate relatively thereto about an upright axis, pivot means defining said upright axis, guide means defining an arcuate path along which said member is relatively movable and providing at the centre of curvature of said arcuate path an axis of vertical articulation between the tractor and the semi-trailer, said axis of vertical articulation positioned between the front and rear axles of the tractor and below the chassis thereof, means holding the guide means and the member from separation one from the other and means constraining the member to move with the semi-trailer on relative pivotal movement between the tractor and the semi-trailer about said upright axis.

5. A coupling as claimed in claim 4 in which road wheels are carried by said front and rear axles and the axis of vertical articulation is substantially level with a plane tangential to the lowest parts of the peripheries of said road wheels.

6. A coupling as claimed in claim 4 in which road wheels are carried by said front and rear axles and the axis of vertical articulation is below a plane tangential to the lowest parts of the peripheries of said road wheels.

7. A coupling as claimed in claim 4 in which said guide means comprises a pair of Watt type linkages arranged one behind the other, each linkage comprising two arms and a link member interconnecting said two arms, each said arm pivotally connected at one of its ends to one of the tractor and semi-trailer and at the other of its ends to said link member, and said link member mounted on the other of the tractor and semi-trailer, whereby relative vertical articulation will be permitted between the tractor and the semi-trailer about an axis of vertical articulation defined by the instantaneous centre of curvature of arcs through which the arms of said linkages will move.

8. A coupling as claimed in claim 4 in which said guide means is carried by the semi-trailer and comprises two laterally spaced plates parallel with the fore-and-aft direction of said semi-trailer, each said plate being formed with at least one elongate aperture, the elongate apertures of said plates being in lateral registration and the member including bearing means engaging said apertures, whereby said guide means is movable in said substantially arcuate path in the fore-and-aft direction of the semi-trailer.

9. A coupling for connection between a tractor and a semi-trailer in an articulated vehicle of which the tractor includes a chassis and at least one front and one rear axle carried by said chassis, the coupling including a member to be mounted on one of the tractor and the semi-trailer to rotate relatively thereto about an upright axis, pivot means defining said upright axis, a part-spherical domed plate having a central aperture therein and having an upper surface engaging a complementary concave lower surface of said member, a complementary convex element engaging the lower surface of said domed plate, means extending through the aperture in said domed plate restraining said member, said domed plate and said convex element from axial separation, said domed plate defining an arcuate path along which said member is relatively slidable and providing at the centre of curvature of said arcuate path an axis of vertical articulation between the tractor and the semi-trailer, said axis of vertical articulation positioned between the front and rear axles of the tractor and below the chassis thereof, and means constraining said member to move with the semi-trailer on relative pivotal movement between the tractor and the semitrailer about said upright axis.

10. A coupling as claimed in claim 9 including a fifth wheel coupling plate to be mounted on one of the tractor and the semi-trailer to rotate relatively thereto about said upright axis, a complementary concave element engaging the upper surface of said domed plate and means connecting together the complementary concave element and said fifth wheel coupling plate.

* * * * *